(12) United States Patent
Wang et al.

(10) Patent No.: US 7,152,046 B2
(45) Date of Patent: Dec. 19, 2006

(54) METHOD AND APPARATUS FOR TRACKING STATUS OF RESOURCE IN A SYSTEM FOR MANAGING USE OF THE RESOURCES

(75) Inventors: Xin Wang, Torrance, CA (US); Thomas DeMartini, Culver City, CA (US); Eddie J. Chen, Rancho Palos Verdes, CA (US); Charles P. Gilliam, Darien, CT (US); Manuel Ham, Downey, CA (US); Guillermo Lao, Torrance, CA (US); Michael C. Raley, Downey, CA (US); Thanh Ta, Huntington Beach, CA (US); Bijan Tadayon, Germantown, MD (US)

(73) Assignee: ContentGuard Holdings, Inc., Wilmington, DE (US)

( * ) Notice: Subject to any disclaimer, the term of this patent is extended or adjusted under 35 U.S.C. 154(b) by 652 days.

(21) Appl. No.: 10/163,631

(22) Filed: Jun. 7, 2002

(65) Prior Publication Data

US 2003/0182235 A1     Sep. 25, 2003

Related U.S. Application Data

(63) Continuation-in-part of application No. 09/867,745, filed on May 31, 2001.

(60) Provisional application No. 60/331,621, filed on Nov. 20, 2001, provisional application No. 60/331,623, filed on Nov. 20, 2001, provisional application No. 60/331,624, filed on Nov. 20, 2001, provisional application No. 60/331,625, filed on Nov. 20, 2001, provisional application No. 60/296,113, filed on Jun. 7, 2001, provisional application No. 60/296,117, filed on Jun. 7, 2001, provisional application No. 60/296,118, filed on Jun. 7, 2001.

(51) Int. Cl.
*G06Q 99/00* (2006.01)
*H04K 1/00* (2006.01)
*H04L 9/00* (2006.01)

(52) U.S. Cl. .......................... 705/51; 705/52; 705/53; 705/54; 705/55; 705/56; 705/57; 705/58; 705/59; 705/50; 380/201; 707/9; 707/104.1; 713/182; 713/183; 713/184; 713/185; 713/186

(58) Field of Classification Search ............ 705/50–59; 380/201; 707/9, 104.1; 713/182–186
See application file for complete search history.

(56) References Cited

U.S. PATENT DOCUMENTS

| | | |
|---|---|---|
| 3,263,158 A | 7/1966 | Janis |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,220,991 A | 9/1980 | Hamano et al. |
| 4,278,837 A | 7/1981 | Best |
| 4,323,921 A | 4/1982 | Guillou |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,644,493 A | 2/1987 | Chandra et al. |
| 4,658,093 A | 4/1987 | Hellman |
| 4,713,753 A | 12/1987 | Beobert et al. |
| 4,740,890 A | 4/1988 | William |
| 4,796,220 A | 1/1989 | Wolfe |
| 4,817,140 A | 3/1989 | Chandra et al. |
| 4,868,376 A | 9/1989 | Lessin et al. |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |

| | | |
|---|---|---|
| 5,047,928 A | 9/1991 | Wiedemer |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,136,643 A | 8/1992 | Fischer |
| 5,138,712 A * | 8/1992 | Corbin ............... 713/200 |
| 5,146,499 A | 9/1992 | Geffrotin |
| 5,148,481 A | 9/1992 | Abraham et al. |
| 5,159,182 A | 10/1992 | Eisele |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,291,596 A | 3/1994 | Mita |
| 5,293,422 A | 3/1994 | Loiacono |
| 5,295,266 A * | 3/1994 | Hinsley et al. ............... 718/101 |
| 5,301,231 A | 4/1994 | Abraham et al. |
| 5,311,591 A | 5/1994 | Fischer |
| 5,319,705 A | 6/1994 | Halter et al. |
| 5,335,346 A * | 8/1994 | Fabbio ............... 711/163 |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,386,369 A | 1/1995 | Christiano |
| 5,394,469 A | 2/1995 | Nagel et al. |
| 5,412,717 A | 5/1995 | Fischer |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,539,735 A | 7/1996 | Moskowitz |
| 5,563,946 A | 10/1996 | Cooper et al. |
| 5,568,552 A | 10/1996 | Davis |
| 5,621,797 A | 4/1997 | Rosen |
| 5,629,980 A | 5/1997 | Stefik et al. |
| 5,633,932 A | 5/1997 | Davis et al. |
| 5,634,012 A | 5/1997 | Stefik et al. |
| 5,638,443 A | 6/1997 | Stefik et al. |
| 5,649,013 A | 7/1997 | Stuckey et al. |
| 5,655,077 A | 8/1997 | Jones et al. |
| 5,708,709 A | 1/1998 | Rose |
| 5,708,717 A | 1/1998 | Alasia |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,748,783 A | 5/1998 | Rhoads |
| 5,757,907 A | 5/1998 | Cooper et al. |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,825,892 A | 10/1998 | Braudaway et al. |
| 5,848,154 A | 12/1998 | Nishio et al. |
| 5,892,900 A * | 4/1999 | Ginter et al. ............... 726/26 |
| 5,917,912 A | 6/1999 | Ginter et al. |
| 5,991,306 A | 11/1999 | Burns et al. |
| 6,047,067 A | 4/2000 | Rosen |
| 6,112,239 A | 8/2000 | Kenner et al. |
| 6,115,471 A | 9/2000 | Oki et al. |
| 6,209,092 B1 | 3/2001 | Linnartz |
| 6,226,618 B1 | 5/2001 | Downs et al. |
| 6,233,684 B1 | 5/2001 | Stefik et al. |
| 6,253,193 B1 | 6/2001 | Ginter et al. |
| 6,301,660 B1 | 10/2001 | Benson |
| 6,327,652 B1 | 12/2001 | England et al. |
| 6,330,670 B1 | 12/2001 | England et al. |
| 6,345,256 B1 | 2/2002 | Milsted et al. |
| 6,397,333 B1 | 5/2002 | Söhne et al. |

FOREIGN PATENT DOCUMENTS

| | | |
|---|---|---|
| EP | 0 084 441 | 7/1983 |
| EP | 0 180 460 | 5/1986 |
| EP | 0 332 304 A3 | 9/1989 |
| EP | 0 332 707 | 9/1989 |
| EP | 0 651 554 | 5/1995 |
| EP | 0 668 695 | 8/1995 |
| EP | 0 715 246 A | 6/1996 |
| EP | 0 725 376 | 8/1996 |
| EP | 0 731 404 A1 | 9/1996 |
| EP | 0 818 748 A | 1/1998 |
| EP | 0 818 748 A2 | 1/1998 |
| EP | 1 041 823 A2 | 10/2000 |
| GB | 2 136 175 | 9/1984 |
| GB | 2 236 604 | 4/1991 |
| JP | 62-241061 | 10/1987 |
| JP | 64-068835 | 3/1989 |
| JP | H03-282733 * | 3/1990 |
| JP | 04-369068 | 12/1992 |
| JP | 05-268415 | 10/1993 |
| JP | 06-175794 | 6/1994 |
| JP | 06-215010 | 8/1994 |
| JP | 07-084852 | 3/1995 |
| JP | 07-200317 | 8/1995 |
| JP | 07-244639 | 9/1995 |
| JP | 0 715 241 | 6/1996 |
| WO | WO 92/20022 | 11/1992 |
| WO | WO 93/01550 | 1/1993 |
| WO | WO 94/01821 | 1/1994 |
| WO | WO 96/24092 | 8/1996 |
| WO | WO 97/48203 | 12/1997 |
| WO | WO 98/11690 | 3/1998 |
| WO | WO 98/42098 | 9/1998 |
| WO | WO 99/49615 | 9/1999 |
| WO | WO 00/59152 | 10/2000 |
| WO | WO 00/73922 A2 | 12/2000 |
| WO | WO 01 13198 A | 2/2001 |
| WO | WO 01/24530 A2 | 4/2001 |
| WO | WO 01/63528 | 8/2001 |

OTHER PUBLICATIONS

Perritt "Knowbots, Permission Headers, and Contract Law". Apr. 30, 1993.*
Weber, Robert. Digital Rights Management Technologies. Oct. 1995. Retrieved from IDS.*
"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.
Flasche, U. et al., "Decentralized Processing of Documents", pp. 119-131, 1986, Comput. & Graphics, vol. 10, No. 2.
Mori, R. et al., "Superdistribution: The Concept and the Architecture", pp. 1133-1146, 1990, The Transactions of the IEICE, vol. E 73, No. 7, Tokyo, JP.
Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Guard", pp. 101, Jun. 6, 1994, Forbes.
Saigh, W.K., "Knowledge is Sacred", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.
Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue 1.
Sirbu, M., "Internet Billing Service Design and prototype Implementation", pp. 67-80, Jan. 1994, IMA Intellectual Property Project Proceedings, vol. 1, Issue 1.
Simmel, S. et al., "Metering and Licensing of Resources: Kala's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue 1.
Tygar, J. et al., "Dyad: A System for Using Physically Secure Coprocessors", pp. 121-152, Jan. 1994, IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.
Nelson, T., "A Publishing and Royalty Model for Networked Documents", pp. 257-259, Jan. 1994, IMA Intellectual Property Project Proceedings, vol. 1, Issue 1.
Robinson, E., "Redefining Mobile Computing", pp. 238-240, 247-248 and 252, Jul. 1993, PC Computing.
Abadi, M. et al., "Authentication and Delegation with Smart-cards", 1990, Research Report DEC Systems Research Center.
Mark Stefik, "Letting Loose the Light: Igniting Commerce in Electronic Publication", pp. 219-253, 1996, Internet Dreams: Archetypes, Myths, and Metaphors, IDSN 0-262-19373-6.
Mark Stefik, "Letting Loose the Light: Igniting Commerce in Electronic Publication", pp. 2-35, Feb. 8, 1995, Internet Dreams: Archetypes, Myths and Metaphors.
Henry H. Perritt, Jr., "Technological Strategies for Protecting Intellectual Property in the Networked Multmedia Enviroment", Apr. 2-3, 1993, Knowbots, Permissions Headers & Contract Law.
PCT International Search Report (PCT/US02/17751) dated Dec. 31, 2002, 3 pages.
European Search Report dated Jun. 11, 2004.
European Search Report dated Apr. 26, 2004.
European Search Report dated Apr. 26, 2004 (European Patent Application No. 02 739 696.9).

* cited by examiner

*Primary Examiner*—James A. Reagan
(74) *Attorney, Agent, or Firm*—Marc S. Kaufman; Carlos R. Villamar; Nixon Peabody, LLP (57) ABSTRACT

A method and system for managing the state of a protected resource in a system for granting access to a protected resource in accordance with usage rights. The usage rights include at least one state variable indicating a status of an associated protected resource. A message related to the state variable is transmitted from a resource control device to an interface framework. The resource control device is coupled to the resource to control use of the resource by enforcing the usage right. A state controller operative to track the value of the state variable is loaded into the framework and instructed to manipulate the value of the state variable in accordance with said message. For example, the message can be a query of the current value of the state variable.

15 Claims, 6 Drawing Sheets

METHOD AND APPARATUS FOR TRACKING STATUS OF RESOURCE IN A SYSTEM FOR MANAGING USE OF THE RESOURCES

RELATED APPLICATION DATA

This application claims benefit from U.S. provisional application Ser. Nos. 60/331,621 filed on Nov. 20, 2001, 60/331,623 filed on Nov. 20, 2001, 60/331,624 filed on Nov. 20, 2001, 60/331,625 filed on Nov. 20, 2001, 60/296,113, filed on Jun. 7, 2001, 60/296,117 filed on Jun. 7, 2001, and 60/296,118 filed on Jun. 7, 2001, the disclosures of which are incorporated herein by reference. This application is a continuation-in-part of copending application Ser. No. 09/867,745 filed on May 31, 2001, the disclosures of which is also incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The invention relates to the management of resources in a computer system. More specifically, the invention relates to a method and apparatus for tracking the state of protected resources, such as digital content, and usage rights associated with the protected resources.

2. Description of the Related Art

BACKGROUND

One of the most important issues impeding the widespread distribution of digital works (i.e. documents or other content in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management (DRM)" herein. There are a number of issues to be considered in effecting a DRM System. For example, authentication, authorization, accounting, payment and financial clearing, rights specification, rights verification, rights enforcement, and document protection issues should be addressed. U.S. Pat. Nos. 5,530,235, 5,634,012, 5,715, 403, 5,638,443, and 5,629,940, the disclosures of which are incorporate herein by reference, disclose DRM systems addressing these issues.

For example, U.S. Pat. No. 5,634,012, discloses a system for controlling the distribution of digital documents. Each rendering device has a repository associated therewith. A predetermined set of usage transaction steps define a protocol used by the repositories for enforcing usage rights associated with a document. Usage rights persist with the document content. The usage rights specify various manners of use of the content such as, viewing only, use once, distribution, and the like. Pre-conditions, such as payment of a fee, proof of identity or other conditions can be required prior to permitting access to the content in accordance with the usage rights. Once the pre-conditions are satisfied access to the content is granted. The concept of conditional access is well known in access control applications also. For example, it is known to grant access to network resources upon entry of login name and password.

The concept of conditional access is a foundation for both access control and DRM systems. A typical pre-condition, i.e. a condition for granting access, defines a list of authorized users along with a set of access rights and conditions to a given resource. Pre-conditions associated with a given resource can be defined as resources associated with certain users. This is known as "role-based" access control. Pre-conditions can also be defined by rules in a process known as "rule-based" access control. Both types of pre-conditions are expressed as an access control list, which is a set of resources or rules defined in some language or data structure.

Conditional access is typically implemented by most systems as an authorization process in which a principal (e.g., a person, a system or a process) is allowed access to a protected resource after certain conditions are met and/or verified.

SUMMARY OF THE INVENTION

A first aspect of the invention is a system for managing the state of a protected resource in a system for granting access to a protected resource in accordance with usage rights. The usage rights include state variables indicating a status of an associated protected resource. The system comprises a protected resource associated with a usage right defined at least in part by a state variable, a resource control device coupled to said resource to control use of said resource by enforcing the usage right, a state controller operative to track the value of a state variable, and an interface framework operative to receive a message related to said state variable from said resource management device, load said state controller, and instruct said state controller to manipulate the value of the state variable in accordance with said message.

A second aspect of the invention is a method for managing the state of a protected resource in a system for granting access to a protected resource in accordance with usage rights including a state variable indicating a status of an associated protected resource. The method comprises transmitting a message related to the state variable from a resource control device to an interface framework, said resource control device being coupled to said resource to control use of said resource by enforcing the usage right, loading into said framework a state controller operative to track the value of the state variable, and instructing said state controller to manipulate the value of the state variable in accordance with said message.

BRIEF DESCRIPTION OF THE DRAWING

The invention is described through a preferred embodiment and the attached drawing in which.

DETAILED DESCRIPTION

Different types of resources require different types of conditions and different mechanisms to protect them from unauthorized use. In the preferred embodiment conditions and rights are part of the entire lifecycle of protected resources. This means that conditions of rights are not just evaluated prior to allowing access, but are also evaluated during the actual consumption of the resource. Additionally, conditions are associated with both the protected resource and the state of the protected resource. Associating conditions with various states of a protected resource provides content owners or service providers a flexible way to protect different types of resources. Resources can be digital content, hardware, software programs, memory space, goods, services (including web services), time, fees, usage rights or a license.

Usage rights, specify manners of use. For example, a manner of use can include the ability to use an item in a specified way for a specified period of time. Further, usage rights can specify transfer rights, such as distribution rights and can permit granting of usage rights to others or the derivation of usage rights. In the preferred embodiment conditions and rights are associated to define manners of use of resources. Accordingly, conditions and rights are referred to as a single entity in the preferred embodiment. However, conditions and rights can exist separately.

The preferred embodiment verifies and validates conditions of rights prior, during and after the usage or consumption of protected resources. Rights and associated conditions can be represented as a state so that the current state and history of each right can be logged and later used. "State variables" track potentially dynamic conditions. State variables are variables having values that represent status of a resource or other dynamic conditions. State variables can be tracked, and the value of state variables can be used in a condition. For example, a usage right, as a resource, can be the right to view content and a condition can be that no other users are logged into the network when the usage right is exercised. In this example, when the value of the appropriate state indicates that other users are logged in, the condition is no longer satisfied and the content can not be viewed, or viewing is terminated.

Figure 1:
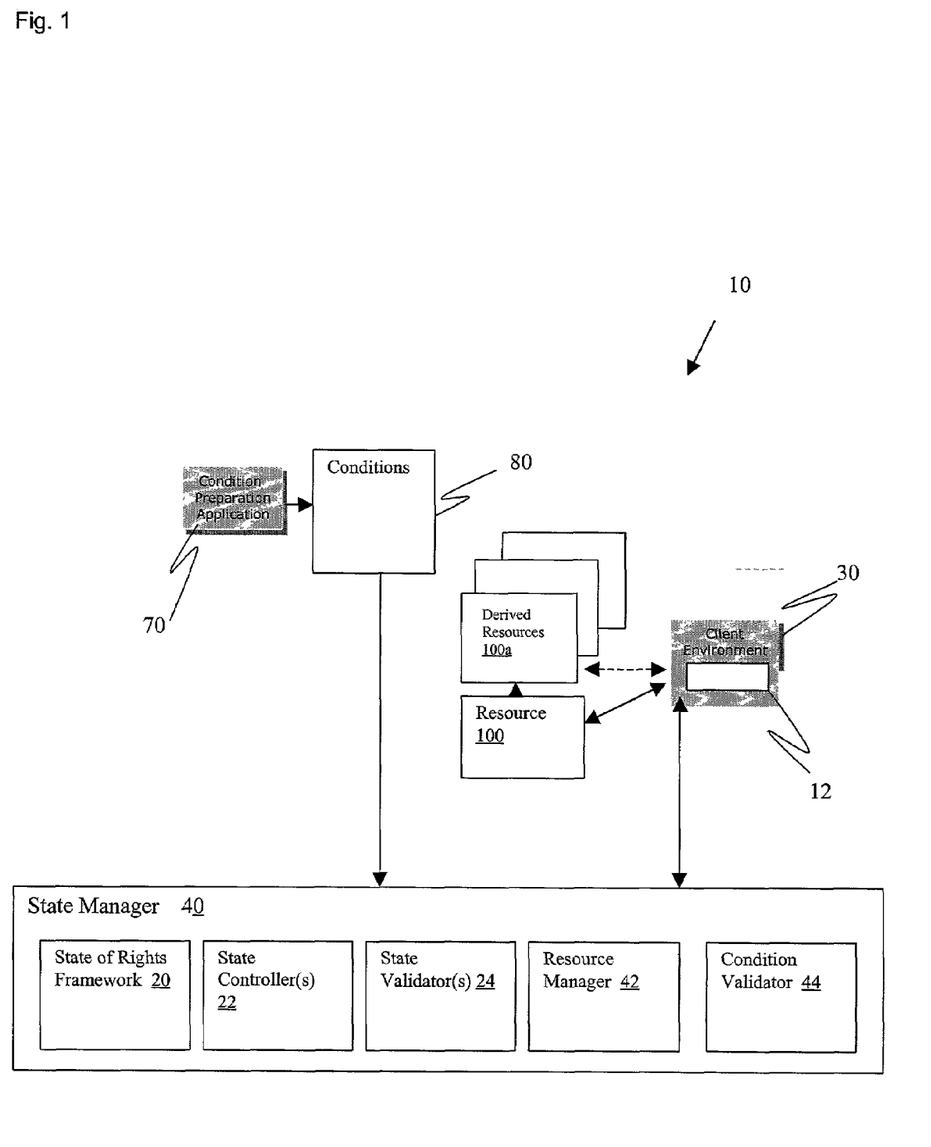
FIG. 1 is a block diagram of a computer architecture of the preferred embodiment.

FIG. 1 illustrates computer architecture 10 of the preferred embodiment. Conditions 80 are described in detail below and can be prepared with preparation application 70 associated with the distributor of an item, a content service provider, an enterprise manager or any other party wishing to control access to resources, such as digital content. A grammar such as XrML™ can be used to specify conditions 80. However, conditions 80 can be specified in any manner. A user operates within client environment 30, including a computer or other device associated with the user. Software application 12, such as a rendering engine or other application, can be installed in client environment 30. State manager 40 controls access to protected resource(s) 100 and derived resource(s) 100a in the manner set forth below.

Figure 7:
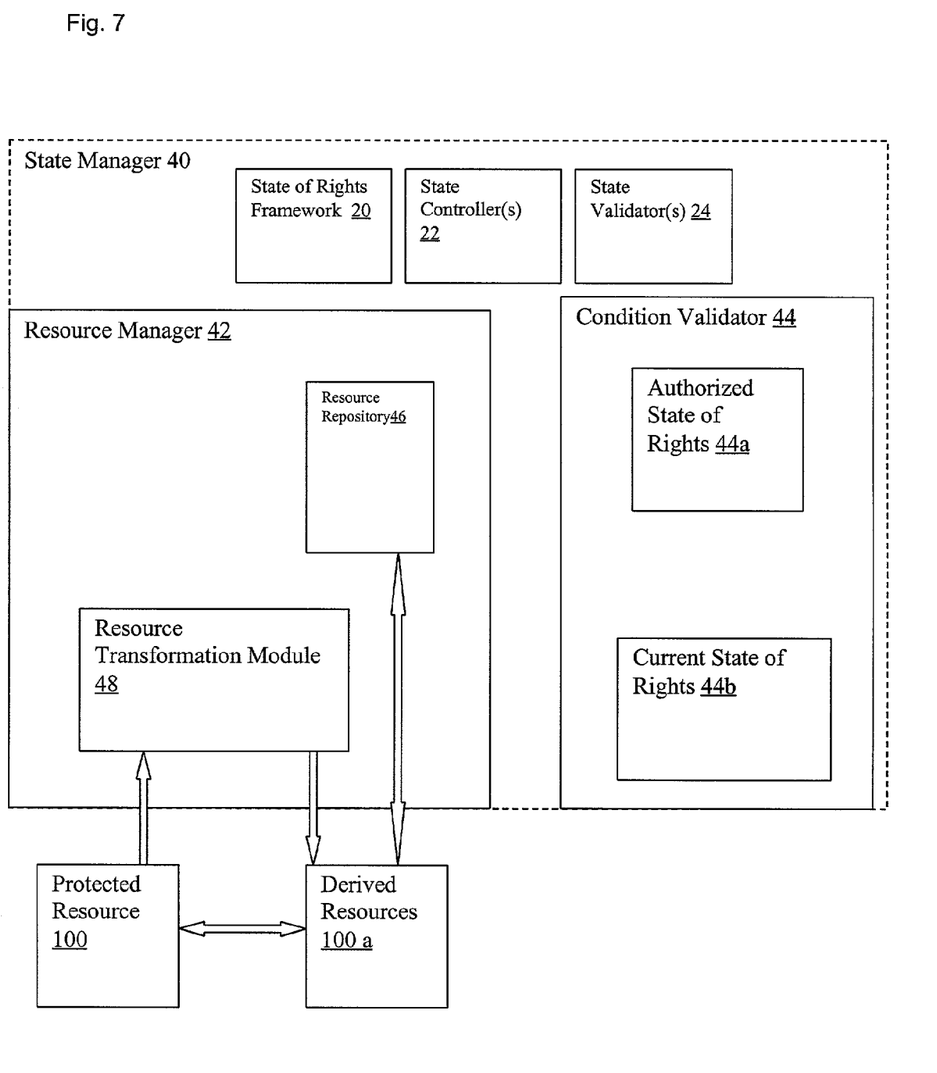
FIG. 7 is a schematic illustration of the state manager with detail of the resource manager.

State manager 40, a computer device in the preferred embodiment, addresses security aspects of access to resource 100 and derived resource 100a. In particular, state manager 40 may authenticate messages by verifying and validating signatures, such as a cryptographic signature, or other identifying characteristics of the messages in a known manner. State manager 40 includes, resource manager 42 and condition validator 44. Resource manager 42 is responsible for resource registration, resource transformation, and resource termination. "Transformation" refers to deriving derived resource 100a from resource 100. As illustrated in FIG. 7, transformation is accomplished by resource transformation module 48 of resource manager 42. For example, in the case where the resource is an encrypted file which represents an image or the like, the derived resources 100a could include the clear image itself and the address of the memory that holds the image. During resource registration the memory address that holds the image is recorded by resource repository 46 of resource manager 42, so that any access to that memory, i.e. derived resource 100a, can be tracked. In addition, tracking marks (such as a watermark) can be inserted into the image, so that it can be tracked at any time.

Condition validator 44 monitors the set conditions and manages the "state of the rights", i.e., a collection of current values of state variables for a given right, as described below. Condition validator 44 interacts with the resource manager 46, as described in greater detail below, to control derived resource 100a. When the current state of right 44b is no longer valid, i.e., does not correspond to authorized state of rights 44a condition validator 44 requests resource manager 42 to delete (or disable) all the derived resources 100a or to notify application 12 that the use of derived resources 100a is no longer allowed as described in greater detail below. State Manager 40 also includes state of rights framework 20, state controller 22, and state validator 24, all of which are described in detail below.

Access to protected resource 100 is based on conditions 80. This type of condition is referred to as an access condition or "pre-condition." However, by associating conditions with both resource 100 and the state of resource 100, it becomes possible to protect resource 100 at various stages during its life cycle. Resource 100 can be protected before a user is granted access, when access is granted, during the actual use of resource 100 and after the use of resource 100. Conditions 80 that are associated with the entire lifecycle of the protected resource can be expressed by use of a grammar including data structures, sets of rules or a language such as XrML™. The preferred embodiment uses of XrML™ as the language to express conditions.

To protect resource 100, conditions 80 can be imposed on resource 100 itself, or any other resources—either tangible or intangible—including those resources that make up any executing environments, such as a application 12 of client environment 30, from which protected resource 100 is accessed and used.

Conditions 80 can be the identity of a user or a group of users who is/are granted access as principals and who use protected resource 100. Examples of conditions 80 are set forth below as expressed in the XrML™ language. Example A expresses a condition associated with a principal "Edgar" who is granted the right to "view" the protected digital content "XrML Book". Example B expresses a condition associated with a group of principals, i.e. all persons that fall under the category "ContentGuard employee" who are granted the right to print the protected digital work "XrML Book".

EXAMPLE A

```
<license>
    <inventory>
        <digitalWork licensePartID="XrMLBook"/>
        <keyHolder licensePartID="Edgar"/>
    </inventory>
    <grant>
        <keyHolder licensePartIDRef="Edgar"/>
        <view/>
        <digitalWork licensePartIDRef="XrMLBook"/>
    </grant>
</license>
```

EXAMPLE B

```
<license>
    <inventory>
        <digitalWork licensePartID="XrMLBook"/>
    </inventory>
    <grant>
        <forAll varName="ContentGuard Employee"/>
        <principal varRef=" ContentGuard Employee"/>
        <print/>
        <digitalWork licensePartIDRef="XrMLBook"/>
    </grant>
</license>
```

Conditions 80 can be conditions on principals who must possess certain properties, such as a certain title, or rights, such as a security clearance. Example C expresses the condition that principals must possess a manager's badge.

EXAMPLE C

```
<license>
    <inventory>
        <digitalWork licensePartID="XrMLBook"/>
        <keyHolder licensePartID="Edgar"/>
    </inventory>
    <grant>
        <forAll varName="anyone"/>
        <principal varRef="anyone"/>
        <possessProperty/>
        <badge>
            <title>Manager</title>
        </badge>
        <view/>
        <digitalWork licensePartIDRef="XrMLBook"/>
    </grant>
</license>
```

Conditions 80 can be conditions on the time interval for access to the protected item. Example D below expresses conditions that key holder "Edgar", as a principal, can view the content "XrML book" not before May 29, 2002 and not after May 29, 2003.

EXAMPLE D

```
<license>
    <inventory>
        <digitalWork licensePartID"XrMLBook"/>
        <keyHolder licensePartID="Edgar"/>
    </inventory>
    <grant>
        <keyHolder licensePartIDRef="Edgar"/>
        <view/>
        <digitalWork licensePartIDRef="XrMLBook"/>
        <validityInterval>
            <notBefore>2002-05-29T00:00:00</notBefore>
            <notAfter>2003-05-29T00:00:00</notAfter>
        </validityInterval>
    </grant>
</license>
```

Conditions 80 can be related to the physical location of the principal or resource used to access content. Example E below expresses the condition that anyone currently in US can print the content "XrML Book"

EXAMPLE E

```
<license>
    <inventory>
        <digitalWork licensePartID="XrMLBook"/>
    </inventory>
    <grant>
        <forAll varName="anyone"/>
        <principal varRef="anyone"/>
        <print/>
        <digitalWork licensePartId="XrMLBook"/>
        <territory>
            <country>US</country>
        </territory>
    </grant>
</license>
```

Conditions 80 can specify a fee that the principal must pay for access. Example F below expresses the condition that anyone can print the content "XrML book" upon payment of a fee of $3.10. Example G below expresses the condition that anyone can print the content "XrML book" upon payment of a fee of $3.10 for each print. Example H below expresses the condition that anyone can view the content "XrML book upon payment of a fee of $10.00 per hour of viewing time.

EXAMPLE F

```
<license>
    <inventory>
        <digitalWork licensePartID="XrMLBook"/>
    </inventory>
    <grant>
        <forAll varName="anyone"/>
        <principal varRef="anyone"/>
        <print/>
        <digitalWork licensePartId="XrMLBook"/>
        <fee>
            <paymentFlat>
                <rate currency="USD">3.10</rate>
            </paymentFlat>
```

-continued

```
            <to>
                <aba>
                    <institution>123456789</institution>
                    <account>987654321</account>
                </aba>
            </to>
        </fee>
    </grant>
</license>
```

EXAMPLE G

```
<license>
    <inventory>
        <digitalWork licensePartID="XrMLBook"/>
    </inventory>
    <grant>
        <forAll varName="anyone"/>
        <principal varRef="anyone"/>
        <print/>
        <digitalWork licensePartIDRef="XrMLBook"/>
        <fee>
            <paymentPerUse>
                <rate currency="USD">3.10</rate>
            </paymentPerUse>
        </fee>
    </grant>
</license>
```

EXAMPLE H

```
<license>
    <inventory>
        <digitalWork licensePartID"XrMLBook"/>
    </inventory>
    <grant>
        <forAll varName="anyone"/>
        <principal varRef="anyone"/>
        <view/>
        <digitalWork licensePartIDRef="XrMLBook"/>
        <fee>
            <paymentMetered>
                <rate currency="USD">10.00</rate>
                <per>PT1H</per>
                <phase>PT10M</phase>
            </paymementMetered>
            <to>
                <aba>
                    <institution>123456789</institution>
                    <account>987654321</account>
                </aba>
            </to>
        </fee>
    </grant>
</license>
```

Example I below expresses the condition that anyone can print the content but the exercise of the print right will be tracked by a tracking service before printing.

EXAMPLE I

```
<license>
    <inventory>
        <digitalWork licensePartID="XrMLBook"/>
        <keyHolder licensePartID="Edgar"/>
    </inventory>
    <grant>
        <forAll varName="anyone"/>
        <principal varRef="anyone"/>
        <print/>
        <digitalWork licensePartIDRef="XrMLBook"/>
        <trackReport>
            <stateReference>
                <uddi>
                    <servicekey>
                        <uuid>...</uuid>
                    </serviceKey>
                </uddi>
                <serviceParam>
                </serviceParam>
            </stateReference>
        </trackReport>
    </grant>
</license>
```

Conditions 80 may also be conditions on the system in which resource 100 is consumed. For example, condition 80 may require that the system has an authorized security mechanism or other specific hardware or software, or only a specific maximum number of users are logged on.

Conditions 80 can specify the repository or other device in which resource 100, such as content, resides. Conditions 80 can relate to the approval notice that the principal must obtain before using the protected resources 100. Conditions 80 can require notification before or after using resource 100. Conditions 80 can specify the previous rights related to the protected resource 100 or other resources. Conditions 80 can also be imposed on other conditions 80 such as how to verify a condition.

Of course, conditions 80 are not limited to the above examples, but can be any restriction, obligation or requirement that is associated with a right to protected resource 100 as pre-conditions, during-access conditions, post-conditions or other conditions. Also, even though the examples above are expressed using XrML™ conditions are not limited to or by XrML and can be expressed in any manner.

Figure 4:
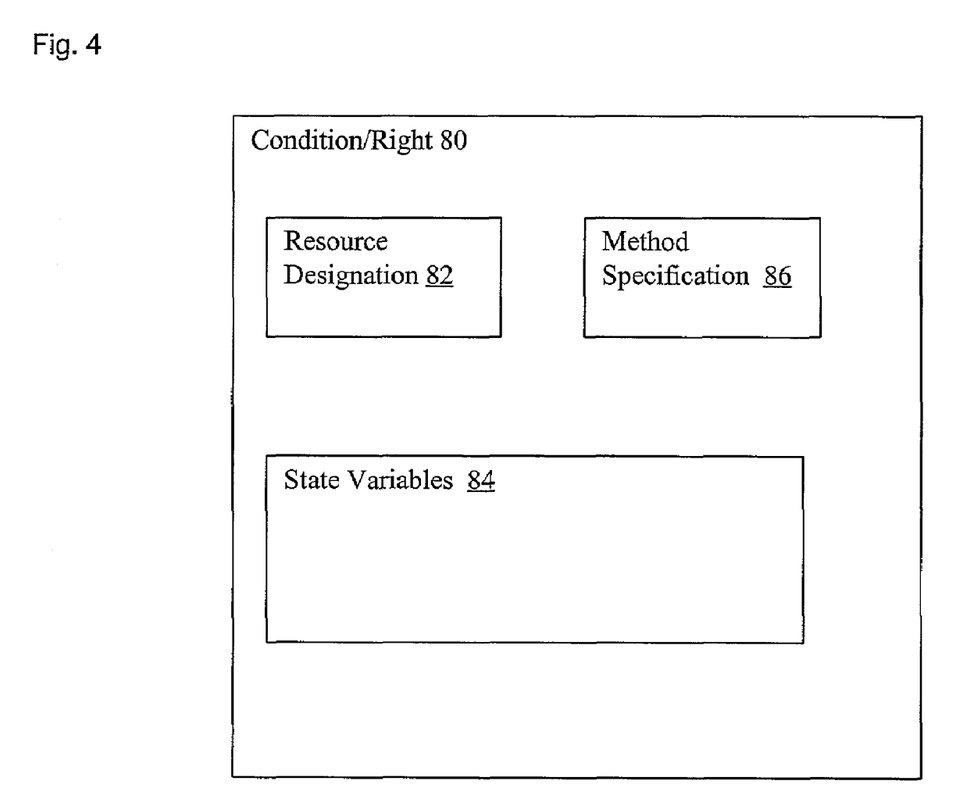
FIG. 4 is a schematic illustration of a condition/right of the preferred embodiment.

FIG. 4 schematically illustrates condition 80 in accordance with the preferred embodiment. Condition 80 includes resource designation 82 which can be expressed either implicitly or explicitly. For example, in Example A above, resource designation 82 is indicated by the attribute "licensePartID" of the "digitalWork" elements. Condition 80 also includes state variables 84, and method specification 86 indicating how values of state variables 84 can be obtained. Method specification 86 can include the location (s) where values of state variables 84 are stored (such as a remote state controller that manages a condition as described below), the communication protocol to communicate with the state controller where the condition is managed, and any parameters needed to obtain the value (such as service parameters, etc). Alternatively, the method can be hardcoded in the system and Method Specification 86 can be omitted.

Figure 5:
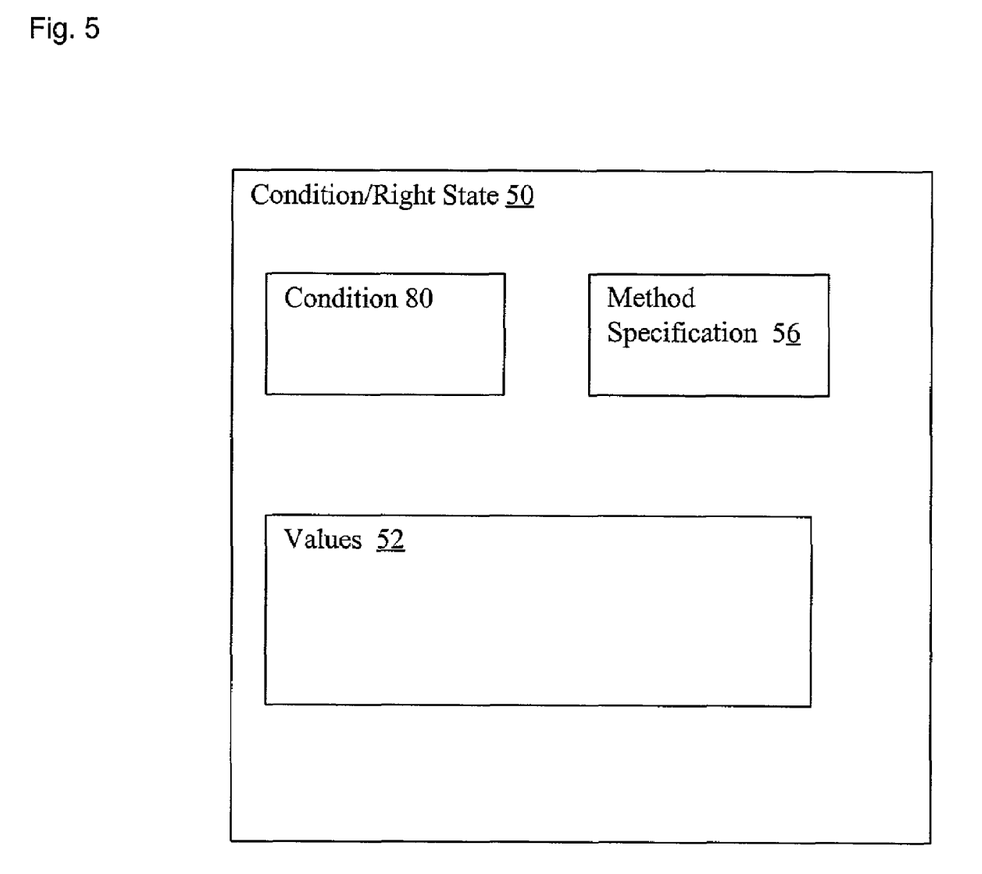
FIG. 5 is a schematic illustration of a state of rights of the preferred embodiment.

As noted above, state variables 84 represent the status of condition 80. Each state variable 44 has a corresponding value at any moment in time for the principal, right, and resource. As note above, the collection of current values of state variables for a given right is referred to as the "state of rights" herein. FIG. 5 illustrates state of rights 50 of the preferred embodiment which includes condition 80, and current values 52 for state variables 84 of condition 80. Method specification 56 indicates the method used to obtain current values 52 of state variables 84, including potentially a source from which the value is obtained, the digital signature of a credential, the session ID of the request and any other appropriate information. Note that method specification 56 can be considered redundant with method specification 86 and can merely be a reiteration thereof. However, in some cases, method specification 56, used to actually obtain values 52, can be different than method specification 86, which is suggested for use in condition 80.

Using state of rights 50 to represent condition 80 for a right simplifies the process of verifying conditions 80 because all the information needed to verify condition 80 is readily accessible. State of rights 50 is constructed and then used whenever the corresponding condition 80 is evaluated and verified. Each state of rights 50 can contain all information needed to verify values 52 of state variables 84.

An authenticated principal is a user that has been processed by a system which validates the authenticity of that user, for example when a user successfully logs-in with a user name and a password, the user becomes an authenticated principal or just "principal". Condition 80 for a given set of rights is defined as a set of required states variable values under which a principal is allowed to access protected resource 100. When an authenticated principal wishes to access protected resource 100, the system state changes from an "original state" to an "authorized state".

Once the system is in an authorized state the principal is then able to access the protected resource 100 for an authorized operation. In many cases, it is not the authenticated principal itself that actually accesses protected resource 100. For example, the access can be delegated to another authenticated principal such as a rendering application, service, or the like. While protected resource 100 is being accessed and consumed, the set of pre-conditions 80 for granting the initial access may no longer be applicable for authorizing continued access. Also, consuming protected resource 100 may transform the resource into a set of temporary, i.e., derived, resources 100a from which the access conditions 80 imposed on the original resources are also not applicable. In order to protect resource 100 and its derived resources 100a while they are being accessed, the preferred embodiment uses a concept for authorization and protection called "during-access conditions" which is described in detail below.

Figure 2:
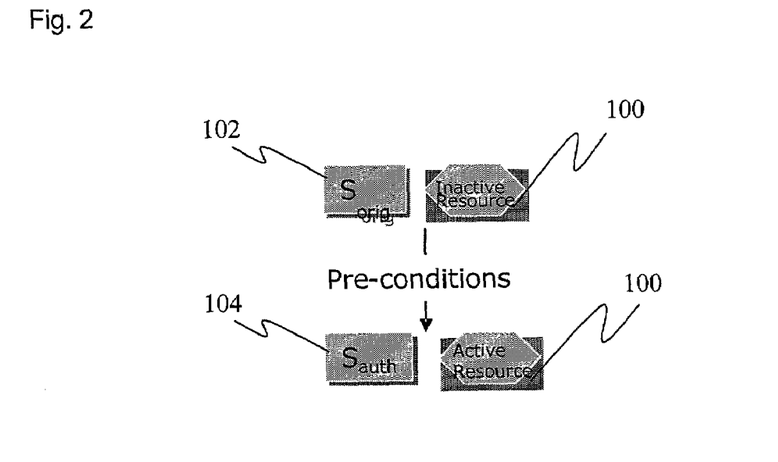
FIG. 2 is a schematic illustration of the states of a conventional access control model.
Figure 3:
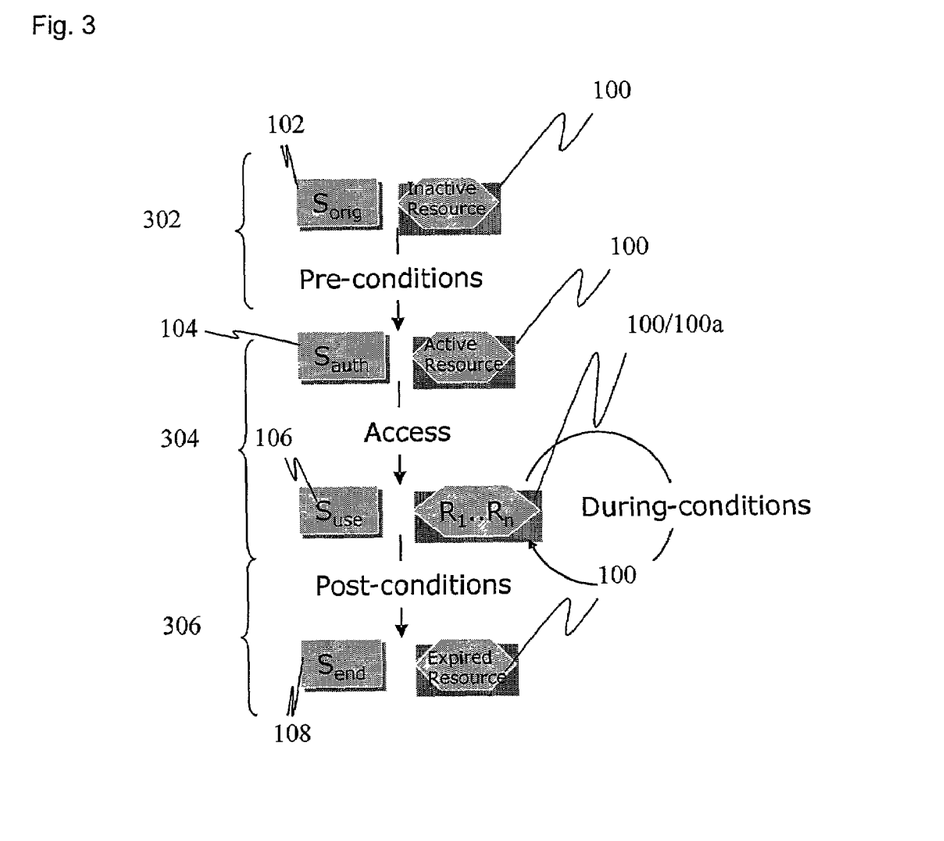
FIG. 3 is a schematic illustration of the states of the preferred embodiment.

In a conventional system, resources are in one of two states. As illustrated in FIG. 2, when resource 100 is inactive, the system is in original state 102 until pre-conditions are satisfied. At that time, resource 100 becomes active and the system enters the authorized or active state 104. To increase control over resources, the preferred embodiment defines two additional states in addition to the "original state" and "authorized state". As illustrated in FIG. 3, during the use or access of protected resource 100, the system state will change through the following states: original state 102, authorized state 104, usage state 106 and end state 108. Conditions 80 can be defined, for each state, that must be met in order to move to the next state or continue within the same state. As note above with respect to FIG. 1, conditions 80 can be defined and prepared using preparation application 70 including any necessary user interface and editing capabilities. Conditions 80 that need to be satisfied to enter the Authorized State are called "pre-conditions". Conditions 80 that need to be satisfied during the use of resource 100 are called "during-access conditions" and conditions 80 that are required at the end of the use are called "post-conditions". Condition validator 44 can invoke the requisite conditions 80 for each state.

During-access conditions are transferred from the original resource 100 to itself and any of derived resources 100a while they are being accessed and consumed by an authenticated principal. For example, if resource 100 is a document which is displayed on a screen of client environment 30 during the authorized operation "view," then derived resources 100a may include the memory that contains the data from the document, the presentation format of the document, and the displayed windows respectively. Derived resources 100a will all be protected by the set of during-access conditions. In other words, the principal will only have access to derived resources 100a as long as the during-access conditions are satisfied. During-access conditions can be defined in the same manner as other conditions 80.

Another example is where an application, such as application 12, requests a service that is a protected resource 100. Once the request is authorized, the application that executes the service may be considered as a derived resource and is subjected to the set of during-access conditions while the service is being executed. During-access conditions define authorized state of rights 44a are applied to current state of rights 44b in the manner described n detail below. Once the requested operation is completed, either mandatory or voluntarily, all derived resources 100a protected by during-access conditions are deleted (or disabled) and the system state is then transferred to the final state by the set of post-access conditions.

Conditions 80 after or during the use or access of a resource may or may not change. Those conditions with unchanged state are called "stateless conditions", while conditions that change after or during the use of the resource are called "stateful conditions". Pre-conditions 80 are usually stateless conditions 80 and are used to control the access to the protected document. During-access conditions and post-conditions are usually stateful conditions 80. They are used to control the lifetime of protected resource 100. (For example, protected resource 100 can no longer be accessed once a specific number of users logged into a network has been exceeded.) With these expanded types of conditions 80 associated with different stages of protected resource 100, the preferred embodiment provides a mechanism to authorize the use of protected resource 100 and to protect and track resource 100 while it is being used.

As illustrated in FIG. 3 and with reference to elements of FIG. 1, a system in accordance with the preferred embodiment progresses through three stages. Access authorization stage 302 is a stage in which state manager 40 authorizes an authenticated principal to access protected resource 100 for an authorized operation through verifying that pre-conditions are satisfied. Resource protection stage 304 is a stage in which state manager 40 protects resource 100 and its derived resources 100a while they are being used by verifying that the during-access conditions remained satisfied. Operation termination stage 306 is a stage in which state manager 40 terminates the use of protected resource 100 and derived resources 100a for a given operation when post-access conditions are satisfied or during-access conditions otherwise cease being satisfied.

In recursive situations, in which multiple accesses are given for the same resource 100, the post-condition can be the same as the pre-condition of the next cycle. In such a case, a non-static parameter can be used in order to prevent infinite loop situations. For example a time-dependent condition or a condition modified or imposed by an external entity, such as human intervention.

Access authorization grants an authenticated principal the right(s) to access protected resource 100 for an authorized operation. Pre-conditions are evaluated, i.e., enforced, against the state of rights. If enforcement is successful, resource 100 and any derived resources 100a enter the authorized state in step 406 and during-access conditions begin to be enforced.

As noted above, resource protection protects both the initial protected resource 100 and its derived resources, 100a by enforcing the set of during-access conditions. The authorized state returned from the access authorization state contains the list of during-access conditions to be enforced during the authorized operation. In a mandatory system all derived resources 100a can be registered with resource repository 46 (see FIG. 7 and description below) of resource manager 42 when derived resources 100a are generated and used. If any during-access condition becomes invalid resource manager 42 will disable access to protected resource 100 and derived resources 100a by application 12.

The termination of an authorized operation executes the set of post conditions (if any are present). Executing post-conditions can permanently change the state of rights and affects the next request for access to resource 100. For example, if a post condition is the removal of access to the resource 100 after an exercise limit has been reached, when the limit is reached the resource 100 is deleted or some other action is taken which disables or prevents access. Operation termination can include resource termination. Resource manager 42 can delete (disable) derived resources 100a when the operation is being terminated, whether or not the operation is forced to terminate, or the application is voluntarily terminating the operation. Deletion (or disabling) of derived resource 100a is important in the process of protection of resource 100. Condition validator 44 commits the use of protected resource 100 and enforce the set of post-conditions. Condition validator 44 will invalidate (disable) protected resource 100 if resource 100 becomes invalid as a result of the change in the system state.

It can be seen that the state of rights may change during the use of resource 100 and therefore, there is a need to maintain, update and retrieve the state of rights. As noted above, condition validator 44 accesses current state of rights 44b to validate conditions 80 that are associated with rights. While resources 100 are being used or accessed, Condition validator 44 monitors the set of during-conditions and manages the current state of rights 44b. Condition validator 44 interacts with resource manager 42 to control derived resource 100a. When the current state of rights is no longer valid, i.e., no longer satisfies the during-access conditions the during-condition validator 44 requests that resource manager 42 delete (or disable) all the derived resources 100a or to notify application 12 that the use of derived resources 100a is no longer allowed. Using the state of rights to represent condition 80 simplifies the process of verifying conditions 80 because all the information needed to verify a specific condition 80 is readily available.

Figure 6:
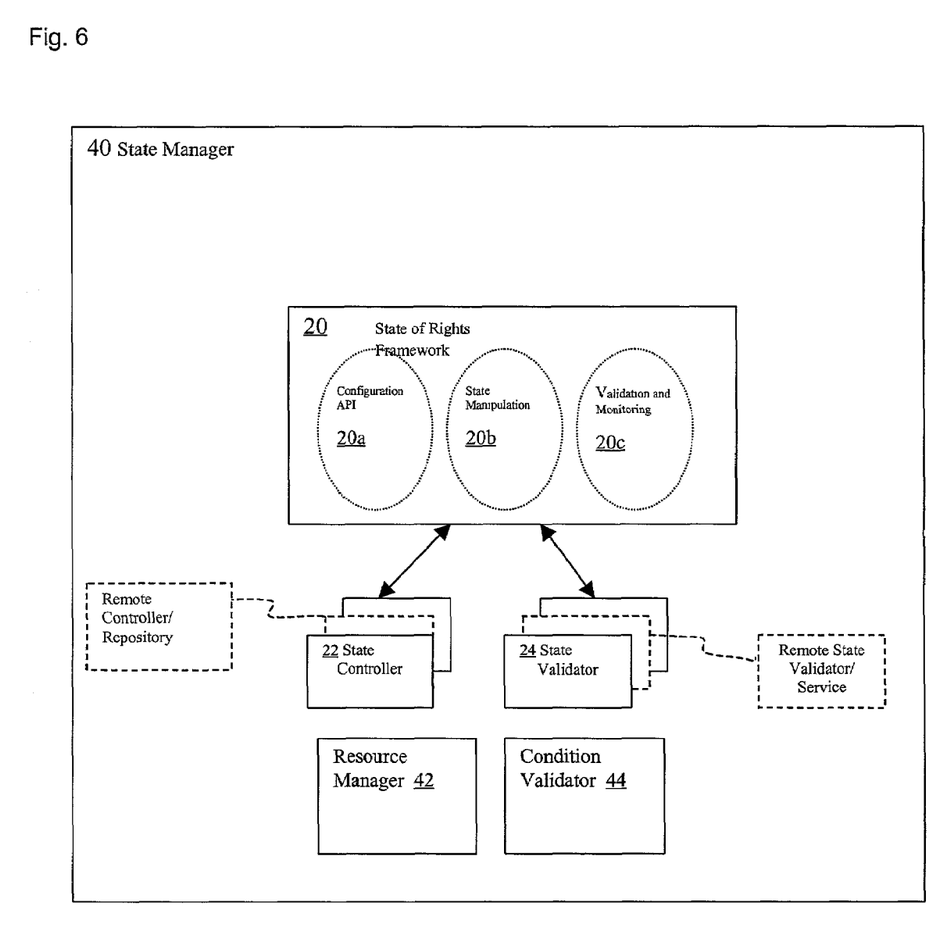
FIG. 6 is a schematic illustration of the state manager of the preferred embodiment with detail of the state of rights framework.

As illustrated in FIGS. 1 and 6, state manager 40 also includes state of rights framework 20 which provides the API to condition validators 44 and provides a plug-in infrastructure to state controller 22 and state validator 24. Framework 20 handles the communication and coordination of tasks among plural state controllers 22 and validators 24.

Each state controller 22 is a component that manages the state for, i.e., tracks the value of a given state variable. The basic structure of state controller 22 consists of a software component that manipulates APIs defined by state of rights framework 20, a protocol to interact with the persistent storages or services to store, and update and query for the current value of the state variable and the history of the state variable. The location of the persistent storage or service that manages the state variable is thus transparent to the state of rights framework 20.

Each state validator 24 is a component that verifies the value of a state variable. Each state validator 24 includes a software component that implements the set of interfaces defined by state validation and monitoring API 20c of rights framework 20. Like state controller 22 the state validator 24 may operate locally or remotely.

As illustrated in FIG. 6, state of rights framework 20 includes state manipulation API 20b which is a set of interfaces to initialize, query, update and transfer state of rights values. As noted above, the basic structure for condition 80 includes the state variables and a method needed to obtain the current value of the state variables.

Like state variables, the values can be represented by a grammar such as a data structure or the XrML™ rights language that describes the current value. The preferred embodiment uses XrML™ to define the state variables and extensions thereof to define the value of the state variables. However the representation of the state variables and its values are not limited to or by XrML™. The following example, shows how a state variable can be defined using XrML™.

EXAMPLE 5

```
<print/>
<sx:stateReference>
    <uddi>
        <serviceKey>
            <uuid>1F8903B0-FC03-4c5b-A445-AAFCCEC011111 </uuid>
        </serviceKey>
    </uddi>
</sx:stateReference>
<sx:exerciseLimit>9</sx:exerciseLimit
```

The above example describes the state variable of a print right that allows no more than 9 copies of the resource to be printed. The value associated with a condition could be as simple as a number as in an example of an exercise limit, or could be a boolean value "yes" or "no" as in an example of requiring an approval. The value can also be stored and managed by a service or component as shown in example K below.

EXAMPLE K

```
<play/>
    <validityIntervalFloating>
        <sx:stateReference>
            <uddi>
                <serviceKey>
                    <uuid>1F8903B0-FC03-4c5b-A445-AAFCCEC011111</uuid>
                </serviceKey>
            </uddi>
        </sx:stateReference>
    </validityIntervalFloating>
```

Example K illustrates a state associated with a floating interval of a "play" right. In this example, the state variable does not contain an actual value associated with the condition. Rather, the remote service (stateReference), acting as state controller 22 is the one that manages the value and it is "opaque" in the expression for the state variable.

State manipulation API 20*b* includes a query interface to query the values of a state variable. A query for a value state variable requires an input that contains the state variable to be queried and the value-type of the response. The value of the response for the state query can be the state value, the state history or both.

The following example L the value of a state variable "exerciseLimit" associated with a "print" right.

EXAMPLE L

```
<stateQuery>
    <! State or the exerciseLimit condition for a print rights>
    <print/>
    <sx:stateReference>
        <uddi>
            <serviceKey>
                <uuid>1F8903B0-FC03-4c5b-A445-AAFCCEC011111</uuid>
            </serviceKey>
        </uddi>
    </sx:stateReference>
    <sx:exerciseLimit/>
    <! Request for a specific response type>
    <response type="value">
</stateQuery>
```

In order to process the query, the state of rights framework 20 will determine what state controller 22 is responsible for this request and then locate, authenticate and load that specific state controller 22 and pass the request to the state controller 22 for processing. State controller 22 can be local or remote. Once the request is processed the response is then returned to the requester via the state of rights framework 20. The following example M describes the response

EXAMPLE M

```
<stateResponse>
    <! Response to the following query request>
    <stateQuery>
        <print/>
        <sx:stateReference>
            <uddi>
                <serviceKey>
                    <uuid>1F8903B0-FC03-4c5b-A445-AAFCCEC011111</uuid>
                </serviceKey>
            </uddi>
        </sx:stateReference>
        <sx:exerciseLimit>9</sx:exerciseLimt>
    </stateQuery>
```

-continued

```
    <! State value returned from state query>
    <stateValue>8</stateValue>
    <! Digital signature of the credential>
    <dsig:signature>
        . . .
    </dsig:signature>
</stateResponse>
```

The query response contains the original query, current value of the queried state variable if available, current status of the state variable or the state history, an identification, a session id and a digital signature of the response. The digital signature can be used guarantee the integrity of the response.

The state can only be updated based on the prior response of the state query provided that the "session ID" in the state query's response is valid. The sessionID is used in the preferred embodiment to identify a request, but any other identification can be used to match the query and the update. Thus, state manage 40 must query the current value of the state variable to obtain the state variable value and the valid session ID in order to update the target state variable. Updating the value of state variable will change the current value of the state variable to the new value.

There are many constraints that can be imposed on updating the value of the state variable. For example, the rights associated with the state variable must still be valid prior to the update request. Another constraint can be that the new value of the state variable after updating must be a valid value allowed for the state variable. For example if the maximum print copy (state variable) is 4 and the current print copy is 3 (current value of state variable) then a request for 2 more copies (update value) will be rejected because the value of the state variable after updating is not an allowed value. Additionally, The principal or the application making the request for the update must be authorized to do so. State of rights framework 20 will identify, authenticate and load state controller 22 to process an updating request. Example M below is an example of a request to update a state value.

EXAMPLE M

```
<stateUpdate>
    <! Update on the previous query value. If the query does not
match with>
    <! The current value of the state variable the update request will
be fail>
    <stateQuery>
        <sx:stateReference>
            <uddi>
```

```
                        <serviceKey>
                              <uuid>1F8903B0-FC03-4c5b-A445-
AAFCCEC011111</uuid>
                        </serviceKey>
                      </uddi>
                  </sx:stateReference>
                  <sx:notMoreThan>9</sx:notMoreThan>
                  <! Session Id is implementation specific to match the
updated request>
                  <and the previous query. Any other identification scheme
can be used instead>
                  <sessionID>. . .</session ID>
                    <stateController>
                          <id>. . . </id>
                    </stateController>
                    <stateValue>8</stateValue>
                    <dsig:signature>
                        . . .
                    </dsig:signature>
               </stateQuery>
            <updateValue>1</updateValue>
     </stateUpdate>
```

State value transfer is similar to the state value update in terms of state management. The main different between the two is how the state history for the state variable is maintained. Once the state is transferred, the current value of the state variable and its history are updated according to the transfer. If the rights from which its states are transferred expire as the result of the state transfer then the transfer is called a complete transfer, otherwise it is called a partial transfer. A state value transfer can have the same constraint as the state value update. The elements involved in the transfer of the state value can be authorized before the transfer occurs.

State manager 40 also manages a set of state validators 24 and provides the set of interfaces to the application which verifies each state variable individually or as a set representing the state of rights. Recall that state of rights is the collection of current values of state variables associated with a given right. State of rights framework 20 will select and load the appropriate state validator 24 for each of the state variables. Once the state validator 24 is selected and loaded, state of rights framework 20 then passes the request to the target state validator 24 and waits for the result as a response message. State manager 40 may concurrently execute all state validators 24 at once or sequentially execute them depending on the dependency between state variables and the configuration of the system.

State validator 24 verifies the state variable value given a state query response. Upon receiving the request for validation for a state variable, state of rights framework 20 examines the state query response and then selects, authenticates and loads the appropriate state validator 24 and passes the state query response to the state validator 24. Based on a configurable policy and information stored in the state query state validator 24 may accept or challenge the information stored in both the state query and response. Once the information stored in the state query and response are verified, the validation process can be as simple as comparing the current value of the state variable with the set of possible (or allowed) values of the state variable. Each state validator 24 can include a software component that implements the set of interfaces defined by state of rights framework 20. State validator 24 may operate locally or remotely.

The preferred embodiment can utilize various devices, such as a personal computers, servers, workstations, PDA's, thin clients and the like. For example, the client environment can be a handheld device such as a mobile phone or a PDA. Various channels for communication can be used. Further, the various functions can be integrated in one device. The disclosed functional devices and modules are segregated by function for clarity. However, the various functions can be combined or segregated as hardware and/or software modules and devices in any manner. The various functions modules and devices have utility separately or in combination.

The various records, messages, elements and portions thereof can be stored on the same device or on different devices. Various links, references, specifications, and the like can be used to associate the elements. Access to any type of resource can be controlled. Any mechanism for tracking values of state variables can be used.

The invention has been described through a preferred embodiment and examples. However, various modifications can be made without departing from the scope of the invention as define by the appended claims and legal equivalents.

The invention claimed is:

1. A system for managing the state of a protected resource in a system for granting access to a protected resource in accordance with usage rights, said usage rights including state variables indicating a status of an associated protected resource, said system comprising:

a protected resource associated with a usage right specifying a plurality of permitted manners of use for the protected resource, where a state of the usage right is defined at least in part by a state variable corresponding to one of the plurality of permitted manners of use for the protected resource;

a resource control device coupled to said resource to control use of said resource by enforcing the usage right;

a state controller operative to track the value of a state variable; and an interface framework operative to receive a message related to said state variable from said resource management device, load said state controller, and instruct said state controller to manipulate the value of the state variable in accordance with said message, wherein said usage rights further include a method specification specifying how values of said state variables are obtained, said method specification includes one of a location where the values of said state variables are stored, and a communication protocol to communicate with said state controller, and said method specification comprises at least one of said location, said communication protocol and a service parameter for obtaining said values of said state variables.

2. A system as recited in claim 1, wherein the message is a value query and wherein said interface framework is operative to instruct said state controller to retrieve a current value of the state variable and return the value as a query response.

3. A system as recited in claim 2, wherein the query response includes the current value, the query, and an ID mechanism.

4. A system as recited in claim 3, wherein said resource control is operative to update a stored value of the state variable with the current value.

5. A system as recited in claim 4, wherein said resource control device comprises a condition validator operative to enforce conditions of the usage right against the stored value.

6. A system as recited in claim 2, further comprising a state validator operative to apply logic to the query response to validate the query response.

7. A system as recited in claim 1, wherein there are plural state controllers corresponding to plural state variables.

8. A system as recited in claim 1, further comprising at least one derived resource for exercising the usage right of the protected resource, said state variables being transferred to said protected resource.

9. A method for managing the state of a protected resource in a system for granting access to a protected resource in accordance with associated usage rights, said usage rights including a state variable indicating a status of an associated protected resource, said method comprising:

transmitting a message related to the state variable from a resource control device to an interface framework, said resource control device being coupled to said protected resource to control use of said resource by enforcing the usage right specifying a plurality of permitted manners of use for the protected resource, where a state of the usage right is defined at least in part by the state variable corresponding to one of the plurality of permitted manners of use for the protected resource;

loading into said framework a state controller operative to track the value of the state variable; and instructing said state controller to manipulate the value of the state variable in accordance with said message, wherein said usage rights further include a method specification specifying how values of said state variables are obtained, said method specification includes one of a location where the values of said state variables are stored, and a communication protocol to communicate with said state controller, and said method specification comprises at least one of said location, said communication protocol and a service parameter for obtaining said values of said state variables.

10. A method as recited in claim 9, wherein the message is a value query and wherein said instructing step comprises instructing said state controller to retrieve a current value of the state variable and return the value as a query response.

11. A method as recited in claim 10, wherein the query response includes the current value, the query, and an ID mechanism.

12. A method as recited in claim 11, further comprising updating a stored value of the state variable in said resource control device with the current value.

13. A method as recited in claim 12, further comprising enforcing conditions of the usage right against the stored value.

14. A method as recited in claim 9, further comprising deriving at least one derived resource for exercising the usage right of the protected resource, and transferring said state variables to said protected resource.

15. A method as recited in claim 9, further comprising applying logic to the query response to validate the query response.

* * * * *